US006762145B2

(12) United States Patent
Yang et al.

(10) Patent No.: US 6,762,145 B2
(45) Date of Patent: Jul. 13, 2004

(54) METHOD OF MAKING A CATALYST FOR POLYMERIZATION AND CO-POLYMERIZATION OF ETHYLENE

(75) Inventors: Chun-Byung Yang, Taejon (KR); Weon Lee, Taejon (KR); Sang-Yull Kim, Seongnam-si (KR)

(73) Assignee: Samsung General Chemicals Co., Ltd., Chungnam (KR)

( * ) Notice: Subject to any disclaimer, the term of this patent is extended or adjusted under 35 U.S.C. 154(b) by 344 days.

(21) Appl. No.: 09/728,427

(22) Filed: Dec. 1, 2000

(65) Prior Publication Data

US 2001/0031694 A1 Oct. 18, 2001

(30) Foreign Application Priority Data

Dec. 1, 1999 (KR) .......................................... 99-0054111

(51) Int. Cl.$^7$ ........................... B01J 31/00; B01J 37/00; C08F 4/02; C08F 4/60
(52) U.S. Cl. ...................... 502/103; 502/127; 502/125; 502/121; 502/129; 502/132; 502/134; 502/104; 502/110
(58) Field of Search ............................. 502/103, 127, 502/125, 121, 129, 132, 134, 104, 110

(56) References Cited

U.S. PATENT DOCUMENTS

| | | |
|---|---|---|
| 3,332,927 A | 7/1967 | Cottingham |
| 3,632,620 A | 1/1972 | Kober et al. |
| 3,642,746 A | 2/1972 | Kashiwa et al. |
| 3,642,772 A | 2/1972 | Haid et al. |
| 3,878,124 A | 4/1975 | Durand et al. |
| 3,899,477 A | 8/1975 | Altemore et al. |
| 3,953,414 A | 4/1976 | Galli et al. |
| 4,013,823 A | 3/1977 | Longi et al. |
| 4,069,169 A | 1/1978 | Toyoda et al. |
| 4,071,672 A | 1/1978 | Kashiwa |
| 4,071,674 A | 1/1978 | Kashiwa et al. |
| 4,076,924 A | 2/1978 | Toyota et al. |
| 4,085,276 A | 4/1978 | Toyota et al. |
| 4,107,413 A | 8/1978 | Giannini et al. |
| 4,107,414 A | 8/1978 | Giannini et al. |
| 4,107,415 A | 8/1978 | Giannini et al. |
| 4,111,835 A | 9/1978 | Foschini et al. |
| 4,148,756 A | 4/1979 | Langer, Jr. |
| 4,156,063 A | 5/1979 | Giannini et al. |
| 4,157,435 A | 6/1979 | Toyota et al. |
| 4,158,642 A | 6/1979 | Langer, Jr. |
| 4,187,196 A | 2/1980 | Giannini et al. |
| 4,220,554 A | 9/1980 | Scata et al. |
| 4,226,963 A | 10/1980 | Giannini et al. |
| 4,263,169 A | 4/1981 | Scata et al. |
| 4,277,372 A | 7/1981 | Matlack |
| 4,315,835 A | 2/1982 | Scatá et al. |
| 4,315,874 A | 2/1982 | Ushida et al. |
| 4,330,649 A | 5/1982 | Kioka et al. |
| 4,336,360 A | 6/1982 | Giannini et al. |
| 4,355,143 A | 10/1982 | Lassalle et al. |
| 4,380,507 A | 4/1983 | Noristi et al. |
| 4,384,983 A | 5/1983 | Hoff |
| 4,399,054 A | 8/1983 | Ferraris et al. |
| 4,401,589 A | 8/1983 | Kioka et al. |
| 4,434,282 A | 2/1984 | Esneault |
| 4,439,540 A | 3/1984 | Cecchin et al. |
| 4,477,639 A | 10/1984 | Nielsen |
| 4,482,687 A | 11/1984 | Noshay et al. |
| 4,487,846 A | 12/1984 | Bailly et al. |
| 4,514,513 A | 4/1985 | Sato et al. |
| 4,518,706 A | 5/1985 | Gessell |
| 4,529,716 A | 7/1985 | Banzi et al. |

(List continued on next page.)

FOREIGN PATENT DOCUMENTS

| | | |
|---|---|---|
| DE | 2 153 520 | 5/1972 |
| DE | 2 230 672 | 12/1972 |
| DE | 2 230 728 | 12/1972 |
| DE | 2 230 752 | 12/1972 |
| DE | 26 05 922 | 8/1976 |
| DE | 25 53 104 | 6/1977 |
| DE | 25 04 036 | 8/1978 |
| DE | 3636060 | 5/1988 |
| EP | 131832 | 5/1987 |
| EP | 0 350 170 | 3/1994 |
| EP | 0 606 125 | 5/1997 |
| EP | 0 602 922 | 1/1998 |
| GB | 1335887 | 10/1973 |
| GB | 1577643 | 10/1980 |
| JP | 52-111528 | 9/1977 |
| JP | 09-176226 | 7/1997 |

OTHER PUBLICATIONS

Abstracts of BE895019 published Mar. 1983, DE324199 published May 1983, GB2111066 published Jun. 1983, and US4952649 published Aug. 1990, printed from Dialog Web.
Abstract of JP7316987 published Dec. 1995.
Abstract of JP52087486 published Jul. 1977.

(List continued on next page.)

Primary Examiner—Mark L. Bell
Assistant Examiner—Jennine Brown
(74) Attorney, Agent, or Firm—Meyertons, Hood, Kivlin, Kowert & Goetzel, P.C.; Eric B. Meyertons

(57) ABSTRACT

The present invention relates to a catalyst for polymerization and co-polymerization of ethylene. More particularly, the present invention relates to a solid titanium catalyst containing magnesium, wherein said catalyst is produced by preparing a magnesium solution by contact-reacting a halogenated magnesium compound with alcohol; reacting said solution with an ester compound having at least one hydroxy group, or a phosphorous compound and a silicon compound having alkoxy groups; producing a solid component with an adjusted particle morphology by adding a mixture of a titanium compound and a silicon compound; reacting the same with an aluminum compound; and then reacting the same with a titanium compound, or a titanium compound and a vanadium compound. As a result, the catalyst of the present invention has high catalytic activity with excellent catalyst morphology.

16 Claims, No Drawings

U.S. PATENT DOCUMENTS

| | | |
|---|---|---|
| 4,579,833 A | 4/1986 | Collomb et al. |
| 4,613,655 A | 9/1986 | Longi et al. |
| 4,614,727 A | 9/1986 | Longi et al. |
| 4,642,328 A | 2/1987 | Morterol et al. |
| 4,761,392 A | 8/1988 | Shiga et al. |
| 4,777,639 A | 10/1988 | Whitehouse |
| 4,806,433 A | 2/1989 | Sasaki et al. |
| 4,816,433 A | 3/1989 | Terano et al. |
| 4,829,037 A | 5/1989 | Terano et al. |
| 4,843,049 A | 6/1989 | Invernizzi et al. |
| 4,847,227 A | 7/1989 | Murai et al. |
| 4,847,639 A | 7/1989 | Sugata et al. |
| 4,866,022 A | 9/1989 | Arzoumanidis et al. |
| 4,912,074 A | 3/1990 | Miro |
| 4,946,816 A | 8/1990 | Cohen et al. |
| 4,952,649 A | 8/1990 | Kioka et al. |
| 4,962,167 A | 10/1990 | Shiraishi et al. |
| 4,970,186 A | 11/1990 | Terano et al. |
| 4,978,648 A | 12/1990 | Barbe et al. |
| 4,988,656 A | 1/1991 | Arzoumanidis et al. |
| 4,990,479 A | 2/1991 | Ishimaru et al. |
| 5,006,499 A * | 4/1991 | Daire .................. 502/104 |
| 5,013,702 A | 5/1991 | Arzoumanidis et al. |
| 5,059,570 A | 10/1991 | Bailly et al. |
| 5,061,667 A | 10/1991 | Murata et al. |
| 5,064,798 A * | 11/1991 | Chang .................. 502/111 |
| 5,081,090 A | 1/1992 | Arzoumanidis et al. |
| 5,104,838 A | 4/1992 | Fujita et al. |
| 5,106,807 A | 4/1992 | Morini et al. |
| 5,124,297 A | 6/1992 | Arzoumanidis et al. |
| 5,130,284 A | 7/1992 | Terano et al. |
| 5,134,104 A | 7/1992 | Sasaki et al. |
| 5,175,332 A | 12/1992 | Chatterton et al. |
| 5,182,245 A | 1/1993 | Arzoumanidis et al. |
| 5,244,996 A | 9/1993 | Kawasaki et al. |
| 5,346,872 A * | 9/1994 | Menon et al. .......... 502/116 |
| 5,419,116 A | 5/1995 | Rast et al. |
| 5,459,116 A | 10/1995 | Ro et al. |
| 5,502,128 A | 3/1996 | Flores et al. |
| 5,585,317 A | 12/1996 | Sacchetti et al. |
| 5,587,436 A * | 12/1996 | Klimek et al. ............ 526/59 |
| 5,587,440 A | 12/1996 | Ehlers et al. |
| 5,643,845 A | 7/1997 | Tajima et al. |
| 5,726,261 A | 3/1998 | Sacchetti et al. |
| 5,780,378 A | 7/1998 | Toida et al. |
| 5,798,424 A | 8/1998 | Kong et al. |
| 5,817,591 A | 10/1998 | Shamshoum et al. |
| 5,844,046 A | 12/1998 | Ohgizawa et al. |
| 5,849,654 A | 12/1998 | Fushimi et al. |
| 5,849,655 A | 12/1998 | Shamshoum et al. |
| 5,869,418 A | 2/1999 | Iiskola et al. |
| 5,880,056 A | 3/1999 | Tsutsui et al. |
| 5,936,049 A | 8/1999 | Kojoh et al. |
| 5,965,478 A | 10/1999 | Goto et al. |
| 5,968,862 A | 10/1999 | Abbott et al. |
| 6,034,025 A * | 3/2000 | Yang et al. .............. 502/126 |
| 6,066,702 A * | 5/2000 | Ro et al. .............. 526/125.3 |
| 6,114,276 A | 9/2000 | Kong et al. |
| 6,214,759 B1 | 4/2001 | Chang et al. |
| 6,291,385 B1 | 9/2001 | Lee et al. |
| 6,482,764 B1 | 11/2002 | Chang et al. |

OTHER PUBLICATIONS

Abstract of JP54040239 published Mar. 1979.
Abstract of JP58083006 published May 1983.
Abstract of JP63054004 published Mar. 1988.
Abstract of JP63191811 published Aug. 1988.
Abstract of JP63040711 published Feb. 1988.
Abstract of JP51136625 published Nov. 1976.
Abstract of KR9202488 published Jan. 1990.
Abstract of KR9300665 published Sep. 1990.
Abstract of JP7316986 published Dec. 1995.
Abstract of CA1040379 published Oct. 1978.
Tinkler et al., "Polymerisation of ethene by the novel titanium complex [Ti(Me$_3$SiNCH$_2$CH$_2$NsiMe$_3$)Cl$_2$]; a metallocene analogue," Chem. Commun., 1996, pp. 2623–2624.
Edelmann, "N–silylated benzamidines: versatile building blocks in main group and coordination chemistry," Coordination Chemistry Reviews, vol. 137, 1994, pp. 403–481.
Zhou et al., "Synthesis and Structure of novel Bridged Dinuclear Indium Complexes," Inorg. Chem., 1996, vol. 35, pp. 1423–1424.
Zhou et al., "Bulky Amidinate Complexes of Tin(IV). Synthesis and Structure of Sn(RNC(R')NR)$_2$C$_2$$_2$ (R =Cyclohexyl, R' =H, Me; R=SiMe$_3$,R'=$^t$Bu)," Inorg. Chem., 1997, vol. 36, pp. 501–504.
Linden et al., "Polymerization of α–Olefins and Butadiene and Catalytic Cyclotrimerization of 1–Alkynes by a New Class of Group IV Catalysts. Control of Molecular Weight and Polynmer Microstructure via Ligand Tuning in Sterically Hindered Chelating Penoxide Titanium and Zirconium Species," J. Am. Chem. Soc., 1995, vol. 117, pp. 3008–3021.
Stokes et al., "Reactions of Cobaloxime Anions and/or Hydrides with Enynes as a New, General Route to 1, 3–and 1,2–Dienylcobaloxime Complexes," Organometallics, 1996, vol. 15, pp. 2624–2632.

* cited by examiner

METHOD OF MAKING A CATALYST FOR POLYMERIZATION AND CO-POLYMERIZATION OF ETHYLENE

BACKGROUND OF THE INVENTION

1. Field of the Invention

The present invention relates to a catalyst for polymerization and co-polymerization of ethylene, or more particularly to a solid titanium catalyst supported onto a carrier containing magnesium, which has a very high catalytic activity with excellent catalyst morphology.

2. Description of the Relevant Art

Catalysts containing magnesium for polymerization and co-polymerization of ethylene are known to have very high catalytic activities and to accord high bulk density, which are suitable for liquid or gas phase polymerization. By liquid phase polymerization of ethylene, it denotes a polymerization process performed in a medium such as bulk ethylene, isopentane, or hexane, and as for the important characteristics of the catalyst used in this process, they are as follows: high activity, bulk density of produced polymers, the amount of low molecular weight polymer dissolved in a medium, etc. Of these characteristics, it could be said that catalytic activity is the most important characteristics of a catalyst.

Many of the titanium-based catalysts containing magnesium for olefin polymerization, and the manufacturing methods thereof have been reported. Especially, many processes making use of magnesium solutions to obtain olefin polymerization catalysts of high bulk density have been known. There is a means of obtaining magnesium solution by reacting a magnesium compound with an electron donor such as alcohol, amine, cyclic ether, or organic carboxylic acid in the presence of a hydrocarbon solvent. As for the cases of using alcohol, they are disclosed in U.S. Pat. Nos. 4,330,649 and 5,106,807. Further, a method for producing a magnesium-supported catalyst by reacting a liquid-phase magnesium solution with a halogen compound such as titanium tetrachloride is well known. Although these types of catalysts provide high bulk density, there are disadvantages at the production stage, such as a need for improvement with respect to catalytic activity, a large quantity of expensive $TiCl_4$ in use, and a large amount of hydrogen chloride produced during the manufacturing process.

U.S. Pat. No. 5,459,116 discloses a method of producing a solid titanium catalyst by contact-reacting a magnesium solution having an ester of at least one hydroxy group as an electron donor with a titanium compound. By using this method, a catalyst with a high polymerization activity and superior bulk density of polymers may be obtained. Yet, there are disadvantages at the production stage, such as a large quantity of expensive $TiCl_4$ in use, and a large amount of hydrogen chloride produced during the manufacturing process.

U.S. Pat. No. 4,843,049 discloses a method of producing a catalyst having high titanium content by reacting a magnesium chloride-ethanol substrate, produced by spray-drying, with titanium alkoxide, followed by reacting diethyl aluminum chloride or ethyl aluminum sesquichloride. However, this method has disadvantages of having alcohol content outside the range of 18–25% and deteriorating bulk density of polymers produced when compounds other than diethyl aluminum chloride or ethyl aluminum sesquichloride are used. Further, there is a problem of setting the titanium content to at least 8 wt % or more in order to obtain high catalytic activity.

U.S. Pat. Nos. 5,726,261 and 5,585,317 disclose a method of producing a catalyst having a porosity of 0.35~0.7, supported with a titanium compound having at least one titanium-halogen and one hydroxy group, by treating the magnesium-ethanol substrate produced by means of a spray-drying method with triethyl aluminum, or heat-treating the same, and then treating it with a titanium alkoxide compound, titanium alkoxide or silicon tetraethoxide, etc. Yet, this method has a disadvantage of somewhat low catalytic activity.

SUMMARY OF THE INVENTION

As shown above, there is a need for the development of a new catalyst for polymerization or co-polymerization of ethylene with the following conditions: simple manufacturing process, high polymerization activity while not using a large amount of expensive titanium compounds, and high bulk density of polymers by means of controlling the catalyst particles. In an embodiment recited herein is disclosed a method for producing, from low-cost compounds via a simple process, a catalyst having excellent catalytic activity, capable of producing polymers of high bulk density by controlling the catalyst particle morphology.

Consequently, one embodiment described herein is directed to a new catalyst for polymerization or co-polymerization of ethylene, wherein said catalyst has enhanced catalytic activity and is capable of producing polymers of high bulk density.

An advantage of the disclosed method is to provide a simple process specifically for producing a catalyst for polymerization or co-polymerization of ethylene.

DETAILED DESCRIPTION OF THE PREFERRED EMBODIMENTS

A solid titanium catalyst of high catalytic activity, capable of producing polymers having high bulk density as described herein, is produced by a simple yet efficient manufacturing process, which includes (i) preparing a magnesium solution by contact-reacting a halogenated magnesium compound with alcohol; (ii) reacting the same with an ester compound that includes at least one hydroxy group, or a silicon compound containing an alkoxyl group and a phosphorous compound; (iii) reacting the same with an aluminum compound, and then producing a solid titanium catalyst by adding a titanium compound, or a titanium compound and a vanadium compound.

Examples of halogenated magnesium compounds used in the present invention are as follows: di-halogenated magnesium such as magnesium chloride, magnesium iodide, magnesium fluoride, and magnesium bromide; alkymagnesium halides such as methylmagnesium halide, ethylmagnesium halide, propylmagnesium halide, butylmagnesium halide, isobutylmagnesium halide, hexylmagnesium halide, and amylmagnesium halide; alkoxymagnesium halides such as methoxymagnesium halide, ethoxymagensium halide, isopropoxymagnesium halide, butoxymagnesium halide, octoxymagnesium halide; and aryloxymagnesium halides such as phenoxymagnesium halide and methylphenoxymagnesium halide. Of the above magnesium compounds, two or more compounds may be used in a mixture. Further, the above magnesium compounds may be effectively used in the form of a complex compound with other metals.

Of the compounds listed above, some may be represented by a simple chemical formula, but the others cannot be so represented depending on the production methods of magnesium compounds. In the latter cases, it may be generally regarded as a mixture of some of the above listed compounds as follows: compounds obtained by reacting a magnesium compound with a polysiloxane compound, a silane compound containing halogen, ester, alcohol, etc.; and compounds obtained by reacting a magnesium metal with alcohol, phenol, or ether in the presence of halosilane, phosphorus pentachloride, or thionyl chloride. However, the preferable magnesium compounds are magnesium halides, especially magnesium chlorides or alkylmagnesium chlorides, preferably those having an alkyl group of 1~10 carbons; alkoxymagnesium chlorides, preferably those having an alkoxy group of 1~10 carbons; and aryloxymagnesium chlorides, preferably those having an aryloxy group of 6~20 carbons. The magnesium solution used may be made by dissolving the aforementioned compounds in alcohol solvent in the presence or absence of a hydrocarbon solvent.

Examples of the types of hydrocarbon solvents used in the present invention are as follows: aliphatic hydrocarbons such as pentane, hexane, heptane, octane, decane, and kerosene; alicyclic hydrocarbons such as cyclobenzene, methylcyclobenzene, cyclohexane, and methylcyclohexane; aromatic hydrocarbons such as benzene, toluene, xylene, ethylbenzene, cumene, and cymene; and halogenated hydrocarbons such as dichloropropane, dichloroethylene, trichloroethylene, carbon tetrachloride, and chlorobenzene.

When a magnesium compound is converted into a magnesium solution, alcohol is used in the presence or absence of the aforementioned hydrocarbons. The types of alcohol include those containing 1~20 carbon atoms, such as methanol, ethanol, propanol, butanol, pentanol, hexanol, octanol, decanol, dodecanol, octadecyl alcohol, benzyl alcohol, phenylethyl alcohol, isopropyl benzyl alcohol, and cumyl-alcohol, or preferably an alcohol containing 1~12 carbon atoms. The average size of a target catalyst and its particle distribution can vary according to the following factors: types of alcohol, the total contents, types of magnesium compounds, the ratio of magnesium to alcohol, etc. Nevertheless, the total amount of alcohol required to obtain magnesium solution is at least 0.5 mol per each mole of a magnesium compound, preferably about 1.0~20 mol, or more preferably about 2.0~10 mol.

The reaction of a magnesium compound with alcohol for producing a magnesium solution is preferably carried out in the presence of a hydrocarbon medium. While it varies depending on the types and the amounts of alcohol and aromatic ether, the reaction temperature should be at least −25° C., preferably −10~200° C., or more preferably about 0~150° C. It is preferable to carry out the reaction for about 15 minutes~5 hours, preferably for about 30 minutes~4 hours.

Of the electron donors used in the present invention, the ester compounds containing at least one hydroxy group include unsaturated aliphatic acid esters having at least one hydroxy group such as 2-hydroxy ethylacrylate, 2-hydroxy ethylmethacrylate, 2-hydroxypropyl acrylate, 2-hydroxypropylmethacrylate, 4-hydroxybutylacrylate, pentaerithritol triacrylate; aliphatic monoesters or polyesters containing at least one hydroxy group such as 2-hydroxy ethyl acetate, methyl 3-hydroxy butylate, ethyl 3-hydroxy butylate, methyl 2-hydroxy isobutylate, ethyl 2-hydroxy isobutylate, methyl-3-hydroxy-2-methyl propionate, 2,2-dimethyl-3-hydroxy propionate, ethyl-6-hydroxy hexanoate, t-butyl-2-hydroxy isobutylate, diethyl-3-hydroxy glutarate, ethyl lactate, isopropyl lactate, butyl isobutyl lactate, isobutyl lactate, ethyl mandelate, dimethyl ethyl tartrate, ethyl tartrate, dibutyl tartrate, diethyl citrate, triethyl citrate, ethyl-2-hydroxy-caproate, diethyl bis-(hydroxy methyl) malonate; aromatic esters having at least one hydroxy group such as 2-hydroxy ethyl benzoate, 2-hydroxy ethylsalicylate, methyl-4-(hydroxy methyl) benzoate, methyl-4-hydroxy benzoate, ethyl-3-hydroxy benzoate, 4-methyl salicylate, ethyl salicylate, phenyl salicylate, propyl-4-hydroxy benzoate, phenyl-3-hydroxy naphthanoate, monoethylene glycol monobenzoate, diethylene glycol monobenzoate, triethylene glycol benzoate; alicyclic esters having at least one hydroxy group such as hydroxy butyl lactone. The amount of an ester compound containing at least one hydroxy group should be 0.001~5 mol per mole of magnesium compound, or preferably 0.01~2 mol per mole.

Another electron donor compound used in the present invention is expressed by the following general formula: $PX_aR^1_b(OR^2)_c$ or $POX_dR^3_e(OR^4)_f$. Here, X is a halogen atom, and $R^1$, $R^2$, $R^3$, or $R^4$ is a hydrocarbon of an alkyl, alkenyl or aryl group, having 1~20 carbon atoms. Moreover, the following conditions are provided: a+b+c=3, $0 \leq a \leq 3$, $0 \leq b \leq 3$, $0 \leq c \leq 3$, d+e+f=3, $0 \leq d \leq 3$, $0 \leq e \leq 3$, and $0 \leq f \leq 3$.

More specifically, for example, it includes phosphorus trichloride, phosphorus tribromide, diethylchlorophosphite, diphenylchlorophosphite, diethylbromophosphite, diphenylbromophosphite, dimethylchlorophosphite, phenylchlorophosphite, trimethylphosphite, triethylphosphite, tri-n-butylphosphite, trioctylphosphite, tridecylphosphite, triphenylphosphite, triethylphosphite, tri-n-butylphosphate, and triphenylphosphate. Other phosphor compounds satisfying the aforementioned formula may be used. As for the amount used, 0.25 mole or below per 1 mole of magnesium compound is appropriate, or more preferably 0.2 mole or below per 1 mole.

As for the silicon compound having an alkoxy group, another electron donor, it is preferable to use a compound having a general formula of $R_nSi(OR)_{4-n}$ (R is a hydrocarbon having 1–12 carbon atoms, and n is a natural number of 1~3). More specifically, the following compounds, for example, can be used: dimethyldimethoxysilane, dimethyldiethoxysilane, diphenyldimethoxysilane, methylphenylmethoxysilane, diphenylethoxysilane, ethyltrimethoxysilane, vinyltrimethoxysilane, methyltrimethoxysilane, phenyltrimethoxysilane, methyltriethoxysilane, ethyltriethoxysilane, vinyltriethoxysilane, butyltriethoxysilane, phenyltriethoxysilane, ethyltriisopropoxysilane, vinyltributoxysilane, ethylsilicate, butylsilicate, and methyltriaryloxylsilane. As for the amount used, 0.05~3 moles per 1 mole of magnesium compound is preferable, or more preferably 0.1~2 moles.

As for the temperature used during contact-reaction of a liquid magnesium compound solution with an ester compound having at least one hydroxy group, or a phosphorous compound and silicon solution having an alkoxy group, the temperature of 0~100° C. is appropriate, or more preferably 10~70° C.

The magnesium compound solution reacted with said electron donors causes re-crystallization of catalyst particles by reacting with a mixture of a liquid titanium compound of general formula of $Ti(OR)_aX_{4-a}$ (R for a hydrocarbon group, X for a halogen atom, and "a" for a natural number of $0 \leq a \leq 4$) and a silicon compound of a general formula of $R_nSiCl_{n-4}$ (R for hydrogen, an alkyl group of 1~10 carbons, an alkoxy, haloalkyl, aryl, halosilylalkyl group, or a halosilyl group of 1–8 carbon atoms, and n for a natural number of $0 \leq a \leq 3$).

Examples of titanium compounds which satisfy the general formula of $Ti(OR)_aX_{4-a}$ include 4-halogenated titanium such as $TiCl_4$, $TiBr_4$, and $TiI_4$; 3-halogenated alkoxy-titanium such as $Ti(OCH_3)Cl_3$, $Ti(OC_2H_5)Cl_3$, $Ti(OC_2)_3$, $Ti(O(I-C_4H_9))Br_3$, and $Ti(O(i-C_4H_9))Br_2$; 2-halogenated alkoxy-titanium such as $Ti(OCH_3)_2Cl_2$, $Ti(OC_2H_5)_2Cl_2$, $Ti(O(i-C_4H_9)_2Cl_2$, and $Ti(OC_2H_5)_2Br_2$; and tetra-alkoxy titanium such as $Ti(OCH_3)_4$, $Ti(OC_2H_5)_4$, and $Ti(OC_4H_9)_4$. A mixture of the above titanium compounds can also be used in the present invention. However, the preferable titanium compounds are those containing halogen, or more preferably titanium tetrachloride.

Examples of silicon compounds satisfying the above general formula of $R_nSiCl_{4-n}$ include silicon tetrachloride; trichlorosilane such as methyltrichlorosilane, ethyltrichlorosilane, phenyltrichlorosilane; dichlorosilane such as dimethylchlorosilane, diethyldichlorosilane, diphenyldichlorosilane, and methylphenyldichlorosilane; monochlorosilane such as trimethylchlorosilane; and a mixture of these silicon compounds can also be used in the present invention, or more preferably silicon tetrachloride can be used.

The amount of the mixture of a titanium compound and a silicon compound used during re-crystallization of the magnesium compound solution is appropriately 0.1~200 mol per mole of a halogenated magnesium compound, preferably 0.1~100 mol, or more preferably 0.2~80 mol. The molar ratio of a titanium compound to a silicon compound in the mixture is appropriately 0.05~0.95, or more preferably 0.1~0.8. The shape and the size of the resultant re-crystallized solid components vary a great deal according to the reaction conditions at the time when the magnesium compound solution is reacted with the mixture of a titanium compound and a silicon compound. Consequently, the reaction of a magnesium compound with the mixture of a titanium compound and a silicon compound should be carried out preferably at a sufficiently low temperature to result in formation of solid components. More preferably, the reaction should be carried out by contact-reaction at −70~70° C., or more preferably at −50~50° C. After the contact-reaction, the reaction temperature is slowly raised for sufficient reaction for the duration of 0.5~5 hours at 50~150° C.

The solid components obtained as above are activated by reacting the same with an aluminum compound. The aluminum compounds used in the present invention for examples include trialkylaluminum having an alkyl group of 1~6 carbon atoms, such as triethylaluminum and triisobutylaluminum; an aluminum compound having one more halogens, such as ethylaluminum dichloride, diethylaluminum chloride, and ethylaluminum sesquichloride; or the mixtures thereof. Moreover, if necessary, an aluminum compound can be used by diluting it to the solvent. At the time of reacting aluminum, it should be carried out at 0~100° C., or more preferably at 20~80° C.

The solid catalyst is produced by reacting a titanium compound or a mixture of a titanium compound and a vanadium compound with said activated solid components. These titanium compounds used in the present invention are titanium halides, and halogenated alkoxy titanium with an alkoxy functional group of 1~20 carbons. At times, a mixture of these compounds can also be used. Of these compounds, titanium halide and a halogenated alkoxy titanium compound having an alkoxy functional group of 1~8 carbons can be appropriately used, or more preferably titanium tetrahalide.

The vanadium compound used in the present invention is a compound with the maximum atomic valence of 4, or the maximum atomic valence of VO of a vanadyl group of 3. It has a general formula of $V(OR)_{4-n}X_n$, or $VO(OR)_{3-m}X_m$. Here, R is an aliphatic or aromatic hydrocarbon group having 1~14 carbons, or $COR^1$ ($R^1$ is an aliphatic or aromatic hydrocarbon group having 1~14 carbons). X is Cl, Br or I, and n is an integer of 0~4, or the ratio thereof. An m is an integer of 0~3, or the ratio thereof. The examples of these compounds include vanadium tetrachloride, vanadyl trichloride, vanadyl tri-n-propoxide, vanadyl triisopropoxide, vanadyl tri-n-butoxide, vanadyl tetra-n-butoxide and vanadyl tetra-n-propoxide. Among these compounds, one or more compounds can be used.

Further, the catalysts produced according to the present invention can be utilized during polymerization or co-polymerization of ethylene. In particular, the catalyst is used in polymerization of ethylene, and also in co-polymerization of ethylene and α-olefin having three or more carbons, such as propylene, 1-butene, 1-pentene, 4-methyl-1-pentene, or 1-hexene.

The polymerization reaction in the presence of the catalyst of the present invention is carried out by means of using (a) the solid catalyst of the present invention, comprising magnesium, titanium, aluminum, halogen, electron donors, and optionally vanadium, and (b) a catalyst system comprising compounds of organic metals of Groups II and III of the Periodic Table.

The solid titanium catalyst (a) of the present invention can be used after pre-polymerization to ethylene or α-olefin prior to the use in the aforementioned polymerization reaction. The pre-polymerization can be carried out in the presence of a hydrocarbon solvent such as hexane, at a sufficiently low temperature, with ethylene or α-olefin under pressure, in the presence of the above catalyst component and an organic aluminum compound such as triethylaluminum. Pre-polymerization, by maintaining the shape of the catalyst by surrounding the catalyst particles with polymers, is helpful in producing good-quality post-polymerization shape in polymers. The weight ratio of the polymers to the catalysts after pre-polymerization is ordinarily 0.1:1 to 20:1.

The organometallic compound (b) used in the polymerization reaction using the catalyst of the present invention can be represented by a general formula of $MR_n$, wherein, M stands for a metal component of Group II or IIIA in the Periodic Table, such as magnesium, calcium, zinc, boron, aluminum, and gallium; R for an alkyl group with 1~20 carbons, such as a methyl, ethyl, butyl, hexyl, octyl, or decyl group; and n for the atomic valence of the metal component. As for more preferable organometallic compounds, trialkyl aluminum having an alkyl group of 1~6 carbons, such as triethylaluminum and triisobutylaluminum, or the mixture thereof can be utilized. On occasions, an organic aluminum compound having one or more halogen, or a hydride group, such as ethylaluminum dichloride, diethylaluminum chloride, ethyl-aluminum sesquichloride, or diisobutylaluminum hydride can also be used.

As for the polymerization reaction, it is possible to carry out either gas phase or bulk polymerization in the absence of an organic solvent, or liquid slurry polymerization in the presence of an organic solvent. These polymerization methods, however, are carried out in the absence of oxygen, water, or other compounds that may act as catalytic poison.

The concentration of the solid titanium compound (a) with respect to the polymerization reaction system, in the case of a liquid phase slurry polymerization, is approximately 0.001~5 mmol in terms of titanium atom of catalysts per one liter of solvent, or more preferably approximately 0.001~0.5 mmol. As for the solvent, the following compounds or the mixtures thereof can be used: alkanes or cycloalkanes such as pentane, hexane, heptane, n-octane, isooctane, cyclohexane, methylcyclohexane; alkylaromatic such as toluene, xylene, ethylbenzene, isopropylbenzene, ethyltoluene, n-propylbenzene, diethylbenzene; halogenated aromatics such as chlorobenzene, chloronaphthalene, ortho-dichlorobenzene; and the mixtures thereof.

In the case of gas phase polymerization, the amount of solid titanium catalysts (a) could be approximately 0.001~5 mmol in terms of titanium atom of catalysts per one liter of a polymerization volume, preferably approximately 0.001~1.0 mmol, or more preferably approximately 0.01~0.5 mmol.

The preferable concentration of an organometallic compound (b) is about 1~2,000 mol, as calculated by aluminum atoms, per mole of titanium atoms in the catalyst (i), or more preferably about 5~500 mol.

To secure a high reaction rate of polymerization, the polymerization herein is carried out at a sufficiently high temperature, irrespective of the polymerization manufacturing process. Generally, the temperature of 20~200° C. is appropriate, or more preferably approximately 20~95° C. The appropriate pressure of monomers at the time of polymerization is the atmospheric to 100 atm, or more preferably 2~50 atm.

In the present invention, the molecular weight is expressed as a melting index (ASTM D 1238), which is generally known in the art. The value of the melting index generally becomes greater as the molecular weight decreases.

The products obtained by the method of polymerization using the catalyst of the present invention are solid ethylene polymer or copolymers of ethylene and α-olefin, which have excellent bulk density and fluidity. Since the yield of polymers is sufficiently high, there is no need for the removal of catalyst residues.

The present invention is further described by means of examples and comparative examples as below but should not be confined or limited to these examples.

EXAMPLE 1

Production of Catalyst

A solid titanium catalyst component was produced by means of the following three steps:

(i) Step: Production of Magnesium Solution
  Into a 1.0 L reactor equipped with a mechanical stirrer, replaced with nitrogen atmosphere, 300 g of $MgCl_2$ and 2,800 Ml of decane were placed therein. After they were stirred at 200 rpm, 2,000 Ml of 2-ethylhexanol was added thereto. The temperature was raised to 120° C., and then the reaction was allowed to continue for three hours. The homogenous solution, which was obtained after the reaction, was cooled to room temperature (25° C.).

(ii) Step: Production of Carrier
  To the magnesium solution, cooled to 25° C., 72 Ml of 2-hydroxyethyl methacrylate and 200 Ml of silicon tetraethoxide were added, and then the reaction was allowed to continue for an hour. Into the above solution adjusted to 25° C., a solution mixture of 550 Ml of titanium tetrachloride and 550 Ml of silicon tetrachloride was dripped thereto for one hour. After the completion of the dripping process, the temperature of the reactor was raised to 90° C. and was maintained at that temperature for one hour. After stopping of stirring, the supernatant of the solution was removed, and the remaining solid layer was washed twice with 3,000 Ml of hexane to produce a solid component (carrier).

(iii) Step: Production of Solid Catalyst
  To 100 g of the solid component, 800 Ml of decane and 1,000 Ml of diethylaluminum chloride (1.0M) were continuously added. The temperature of the reactor was raised to 60° C., which was maintained for two hours. Then, 600 Ml of decane was added therein for washing (four times). To this, 1,000 Ml of decane and 300 Ml of $TiCl_4$ were added, after which the temperature was raised to 100° C. for 2 hours. After the reaction, the reactor was cooled to room temperature and was instilled with 300 Ml of hexane for washing until the removal of free unreacted titanium chloride. The titanium content of the catalyst so produced was 4.2%.

Polymerization

A 2-L high-pressure reactor was dried in an oven and assembled while hot. In order to make the inside of the reactor nitrogen atmosphere, nitrogen and vacuum were alternatively manipulated three times in the reactor. It was then instilled with 1,000 Ml of n-hexane, after which 2 mmols of triethylaluminum and 0.01 mmol of the solid catalyst, in terms of titanium atoms or titanium+vanadium metal atoms, were added thereto. Then, 1,000 Ml of hydrogen was added. The temperature was raised to 80° C. while stirring at 700 rpm. The pressure of ethylene was adjusted to 100 psi, and the polymerization was allowed to continue for 20 minutes. After the polymerization, the temperature of the reactor was lowered to room temperature, and an excessive amount of ethanol solution was added to the polymerized matter. The polymers thus produced were collected by separation and was vacuum-dried in an oven at 50° C. for at least six hours, whereby polyethylene was obtained in the form of white powder.

The polymerization activities (kg of polyethylene divided by g of catalyst) were calculated as the weight (kg) ratio of the polymers as produced per amount of the catalysts so used (g of catalyst). The results of polymerization are shown in Table 1, together with bulk densities (g/Ml) and melting indexes (g/10 minutes) of the polymers.

COMPARATIVE EXAMPLE 1

To 100 g of the solid component produced in Step (ii) of Example 1, 800 Ml decane and 1,000 Ml of diethyl aluminum chloride (1.0M) were continuously added. The temperature was raised to 60° C., which was maintained for two hours. After the reaction, the reactor was cooled to room temperature, and 600 Ml of decane was added thereto for washing it four times. To this, 600 Ml of decane and 30 Ml of $VCl_4$ were added, after which the temperature was raised to 100° C. for 2 hours. After the reaction, the reactor was cooled to room temperature and was instilled with 300 Ml of hexane for washing until the removal of free unreacted $VCl_4$. The vanadium content of the catalyst so produced was 1.7%. The polymerization reaction was carried out under the conditions of Example 1, the results of which are shown in Table 1.

EXAMPLE 2

The catalyst was produced by treating 15 g of the catalyst produced in Step (iii) during the catalyst production process of Example 1, with 100 Ml of decane and $VCl_4$ with the molar ratio of Ti/V=0.1 under the same reaction conditions as those of Example 1. The polymerization reaction was carried out under the conditions of Example 1, the results of which are shown in Table 1.

EXAMPLE 3

The catalyst was produced by treating 15 g of the catalyst produced in Step (iii) during the catalyst production process of Example 1, with 100 Ml of decane and $VCl_4$ with the molar ratio of Ti/V=0.3 under the same reaction conditions as those of Example 1. The polymerization reaction was carried out under the conditions of Example 1, the results of which are shown in Table 1.

EXAMPLE 4

The catalyst was produced by treating 15 g of the catalyst produced in Step (iii) during the catalyst production process of Example 1, with 100 Ml of decane and $VCl_4$ with the molar ratio of Ti/V=0.5 under the same reaction conditions as those of Example 1. The polymerization reaction was carried out under the conditions of Example 1, the results of which are shown in Table 1.

EXAMPLE 5

The catalyst was produced by treating 15 g of the catalyst produced in Step (iii) during the catalyst production process of Example 1, with 100 Ml of decane and $VCl_4$ with the molar ratio of Ti/V=0.7 under the same reaction conditions as those of Example 1. The polymerization reaction was carried out under the conditions of Example 1, the results of which are shown in Table 1.

EXAMPLE 6

The catalyst was produced by treating 15 g of the catalyst produced in Step (iii) during the catalyst production process of Example 1, with 100 Ml of decane and $VCl_4$ with the molar ratio of Ti/V=1.0 under the same reaction conditions as those of Example 1. The polymerization reaction was carried out under the conditions of Example 1, the results of which are shown in Table 1.

EXAMPLE 7

The catalyst was produced by treating 15 g of the catalyst produced in Step (iii) during the catalyst production process of Comparative Example 1, with 100 Ml of decane and $TiCl_4$ with the molar ratio of Ti/V=1.0 under the same reaction conditions as those of Example 1. The polymerization reaction was carried out under the conditions of Example 1, the results of which are shown in Table 1.

EXAMPLE 8

In Step (ii) of the catalyst production process of Example 1, 76.0 Ml of tributylphosphate and 100 Ml of silicon tetraethoxide were used to produce a catalyst as in Example 1. The titanium content of the catalyst thus produced was 3.6%. The polymerization reaction was carried out under the conditions of Example 1, the results of which are shown in Table 1.

EXAMPLE 9

The catalyst was produced by treating 15 g of the catalyst produced in Step (iii) during the catalyst production process of Example 8, with 100 Ml of decane and $VCl_4$ with the molar ratio of Ti/V=0.1 under the same reaction conditions as those of Example 8. The polymerization reaction was carried out under the conditions of Example 1, the results of which are shown in Table 1.

EXAMPLE 10

The catalyst was produced by treating 15 g of the catalyst produced in Step (iii) during the catalyst production process of Example 8, with 100 Ml of decane and $VCl_4$ with the molar ratio of Ti/V=0.3 under the same reaction conditions as those of Example 8. The polymerization reaction was carried out under the conditions of Example 1, the results of which are shown in Table 1.

EXAMPLE 11

The catalyst was produced by treating 15 g of the catalyst produced in Step (iii) during the catalyst production process of Example 8, with 100 Ml of decane and $VCl_4$ with the molar ratio of Ti/V=0.5 under the same reaction conditions as those of Example 8. The polymerization reaction was carried out under the conditions of Example 1, the results of which are shown in Table 1.

EXAMPLE 12

The catalyst was produced by treating 15 g of the catalyst produced in Step (iii) during the catalyst production process of Example 8, with 100 Ml of decane and $VCl_4$ with the molar ratio of Ti/V=0.7 under the same reaction conditions as those of Example 8. The polymerization reaction was carried out under the conditions of Example 1, the results of which are shown in Table 1.

EXAMPLE 13

The catalyst was produced by treating 15 g of the catalyst produced in Step (iii) during the catalyst production process of Example 8, with 100 Ml of decane and $VCl_4$ with the molar ratio of Ti/V=1.0 under the same reaction conditions as those of Example 8. The polymerization reaction was carried out under the conditions of Example 1, the results of which are shown in Table 1.

EXAMPLE 14

The catalyst was produced by treating 15 g of the catalyst produced in Step (iii) during the catalyst production process of Example 8, with 100 Ml of decane and $VOCl_3$ with the molar ratio of Ti/V=0.3 under the same reaction conditions as those of Example 8. The polymerization reaction was carried out under the conditions of Example 1, the results of which are shown in Table 1.

EXAMPLE 15

The catalyst was produced by treating 15 g of the catalyst produced in Step (iii) during the catalyst production process of Example 8, with 100 Ml of decane and $VOCl_3$ with the molar ratio of Ti/V=0.7 under the same reaction conditions as those of Example 8. The polymerization reaction was carried out under the conditions of Example 1, the results of which are shown in Table 1.

EXAMPLE 16

The catalyst was produced by treating 15 g of the catalyst produced in Step (iii) during the catalyst production process of Example 8, with 100 Ml of decane and $VO(OC_3H_7)_3$ with the molar ratio of Ti/V=1.0 under the same reaction conditions as those of Example 8. The polymerization reaction was carried out under the conditions of Example 1, the results of which are shown in Table 1.

COMPARATIVE EXAMPLE 2

To 100 g of the solid component produced in Step (ii) of Example 8, 800 Ml decane and 1,000 Ml of diethyl aluminum chloride (1.0M) were continuously added. The temperature was raised to 60° C., which was maintained for two hours. After the reaction, the reactor was cooled to room temperature, and 600 Ml of decane was added thereto for washing it four times. To this, 600 Ml of decane and 30 Ml of $VCl_4$ were added, after which the temperature was raised to 100° C. for 2 hours. After the reaction, the reactor was cooled to room temperature and was instilled with 300 Ml of hexane for washing until the removal of free unreacted $VCl_4$. The vanadium content of the catalyst so produced was 1.3%. The polymerization reaction was carried out under the conditions of Example 1, the results of which are shown in Table 1.

TABLE 1

| Examples | Ti (wt %) | V (wt %) | Activity (PE kg/g of catalyst/hr) | Bulk Density (g/Ml) | Melting Index (g/10 min) |
|---|---|---|---|---|---|
| 1 | 4.2 | — | 15.2 | 0.36 | 1.07 |
| 2 | 3.9 | 0.91 | 24.1 | 0.35 | 0.43 |
| 3 | 3.7 | 1.12 | 24.2 | 0.34 | 0.20 |
| 4 | 3.9 | 1.42 | 32.1 | 0.33 | 0.12 |
| 5 | 3.5 | 1.51 | 34.6 | 0.34 | 0.21 |
| 6 | 3.4 | 1.57 | 33.1 | 0.36 | 0.26 |
| 7 | 1.9 | 2.04 | 22.6 | 0.36 | 0.07 |
| 8 | 3.6 | — | 13.8 | 0.37 | 0.92 |
| 9 | 3.3 | 1.15 | 27.9 | 0.35 | 0.14 |
| 10 | 3.2 | 1.74 | 26.4 | 0.37 | 0.12 |
| 11 | 3.3 | 1.82 | 37.2 | 0.33 | 0.99 |
| 12 | 3.0 | 1.76 | 36.9 | 0.34 | 0.11 |
| 13 | 3.4 | 2.14 | 33.4 | 0.35 | 0.12 |
| 14 | 3.5 | 1.95 | 29.2 | 0.36 | 0.07 |
| 15 | 3.5 | 2.42 | 22.4 | 0.36 | 0.06 |
| 16 | 3.4 | 2.68 | 23.1 | 0.37 | 0.03 |
| CE 1 | — | 1.7 | 5.7 | 0.34 | 0.019 |
| CE 2 | — | 1.3 | 4.6 | 0.33 | 0.014 |

* CE: Comparative Example

INDUSTRIAL APPLICABILITY

As shown above, the catalyst of the present invention for polymerization and co-polymerization of ethylene involves a simple production process and results in excellent catalytic activity. Further, the present invention produces polymers of high bulk density and narrow particle distribution with the effect of reducing the amount of fine particles.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of forming a catalyst for polymerization and co-polymerization of ethylene comprising:
   preparing a magnesium solution by contact-reacting a halogenated magnesium compound with alcohol;
   reacting the magnesium solution with an ester compound comprising at least one hydroxy group, or a phosphorus compound and a silicon compound comprising alkoxy groups, and then producing a solid component by adding a mixture of a titanium compound and a silicon compound thereto; and
   reacting the solid component with an aluminum compound, and then reacting the same with a titanium compound, or a titanium compound and a vanadium compound.

2. The method of claim 1, wherein the ester compound comprising at least one hydroxy group comprises an unsaturated aliphatic acid ester comprising at least one hydroxy group, an aliphatic monoester or polyester comprising at least one hydroxy group, an aromatic ester comprising at least one hydroxy group, or an alicyclic ester comprising at least one hydroxy group.

3. The method of claim 1, wherein the phosphorus compound comprises phosphorus trichloride, phosphorus tribromide, diethylchlorophosphite, diphenylchlorophosphite, diethylbromophosphite, diphenylbromophosphite, dimethylchlorophosphite, phenylchlorophosphite, trimethylphosphite, triethylphosphite, tri-n-butylphosphite, trioctylphosphite, tridecylphosphite, triphenylphosphite, triethylphosphite, tri-n-butylphosphate, or triphenylphosphate.

4. The method of claim 1, wherein the silicon compound comprising alkoxy groups comprises dimethyldimethoxysilane, dimethyldiethoxysilane, diphenyldimethoxysilane, methylphenylmethoxysilane, diphenyldiethoxysilane, ethyltrimethoxysilane, vinyltrimethoxysilane, methyltrimethoxysilane, phenyltrimethoxysilane, methyltriethoxysilane, ethyltriethoxysilane, vinyltriethoxysilane, butyltriethoxysilane, phenyltriethoxysilane, ethyltriisopropoxysilane, vinyltributoxysilane, ethylsilicate, butylsilicate, or methyltriaryloxylsilane.

5. The method of claim 1, wherein the titanium compound is represented by a general formula of $Ti(OR)_a X_{4-a}$, where R is a hydrocarbon group, X is a halogen atom, and is a natural number from 0 to 4; and wherein the silicon compound is represented by a general formula of $R_n SiCl_{n-4}$, where R is hydrogen, an aryl, alkoxy, haloalkyl or alkyl group having 1–10 carbon atoms, or a halosilylalkyl or halosilyl group having 1–8 carbon atoms, and n is a natural number from 0 to 4.

6. The method of claim 1, wherein the titanium compound comprises a 4-halogenated titanium, a 3-halogenated alkoxytitanium, a 2-halogenated alkoxytitanium, or a tetraalkoxytitanium, and wherein the silicon compound is silicon tetrachloride, a trichlorosilane, a dichlorosilane, or a monochlorosilane.

7. The method of claim 1, wherein the titanium compound is titanium tetrachloride, and the silicon compound is silicon tetrachloride.

8. The method of claim 1, wherein the amount of the mixture of the titanium compound and the silicon compound is 0.1–200 mol per mole of the halogenated magnesium compound, and the molar ratio of the titanium compound to the silicon compound in the mixture is 0.05–0.95.

9. The method of claim 1, wherein the aluminum compound comprises a trialkylaluminum comprising an alkyl group of 1–6 carbon atoms, an aluminum compound comprising one or more halogen atoms, or mixtures thereof.

10. The method of claim 1, wherein the vanadium compound is a compound with a maximum atomic valence of 4, or a maximum atomic valence of VO of a vanadyl group of 3, having a general formula of $V(OR^4)_{4-n}X_n$, or $VO(OR^4)_{3-m}X_m$, where $R^4$ is an aliphatic or aromatic hydrocarbon group having 1–14 carbons, or $COR^5$, where $R^5$ is an aliphatic or aromatic hydrocarbon group having 1–14 carbons, wherein X is Cl, Br or I; n is an integer of 1–14, or the ratio thereof; and m is an integer of 0–3, or the ratio thereof.

11. The method of claim 1, wherein the ester compound comprising at least one hydroxy group comprises 2-hydroxy ethylacrylate, 2-hydroxy ethylmethacrylate, 2-hydroxy propylacrylate, 2-hydroxy propylmethacrylate, 4-hydroxy butylacrylate, pentaerithritol tri-acrylate, 2-hydroxy ethyl acetate, methyl 3-hydroxy butylate, ethyl 3-hydroxy butylate, methyl 2-hydroxy isobutylate, ethyl 2-hydroxy isobutylate, methyl-3-hydroxy-2-methyl propionate, 2,2-dimethyl-3-hydroxy propionate, ethyl-6-hydroxy hexanoate, t-butyl-2-hydroxy isobutylate, diethyl-3-hydroxy glutarate, ethyl-lactate, isopropyl lactate, butyl-isobutyl lactate, isobutyl lactate, ethyl mandelate, dimethyl ethyl tartrate, ethyl tartrate, dibutyl tartrate, diethyl citrate, triethyl citrate, ethyl-2-hydroxy-caproate, diethyl bis-(hydroxymethyl) malonate, 2-hydroxy ethyl benzoate, 2-hydroxy ethyl salicylate, methyl-4-(hydroxy methyl) benzoate, methyl-hydroxy benzoate, ethyl-3-hydroxy benzoate, 4-methyl salicylate, ethyl salicylate, phenyl salicylate, propyl-4-hydroxy benzoate, phenyl-3-hydroxy naphthanoate, monoethylene glycol monobenzoate, diethylene glycol monobenzoate, triethylene glycol monobenzoate, or hydroxy butyl-lactone.

12. The method of claim 1, wherein the phosphorus compound is a compound expressed by $PX_a R^1_b (OR^2)_c$, or $POX_d R^3_e (OR^4)_f$, where X is a halogen atom; and $R^1$, $R^2$, $R^3$ or $R^4$ is a hydrocarbon of an alkyl, or alkenyl or aryl group, having 1–20 carbon atoms, each of which can be same or different from one another, with a+b+c=3, $0 \leq a \leq 3$, $0 \leq b \leq 3$, $0 \leq c \leq 3$, d+e+f=3, $0 \leq d \leq 3$, $0 \leq e \leq 3$, and $0 \leq f \leq 3$.

13. The method of claim 1, wherein the silicon compound comprising alkoxy groups is a compound of a general formula of $R_n Si(OR)_{4-n}$, where R is a hydrocarbon group having 1–12 carbon atoms, and n is a natural number from 1–3.

14. The method of claim 1, wherein the titanium compound comprises $TiCl_4$, $TiBr_4$, $TiI_4$, $Ti(OCH_3)Cl_3$, $Ti(OC_2H_5)Cl_3$, $Ti(OC_2H_5)Br_3$, $Ti(O(i\text{-}C_4H_9))Br_3$, $Ti(OCH_3)_2Cl_2$, $Ti(OC_2H_5)_2Cl_2$, $Ti(O(i\text{-}C_4H_9))_2Cl_2$, $Ti(OC_2H_5)_2Br_2$, $Ti(OCH_3)_4$, $Ti(OCH_2H_5)_4$, or $Ti(OC_4H_9)_4$.

15. The method of claim 1, wherein the silicon compound comprises silicon tetrachloride, methyltrichlorosilane, ethyltrichlorosilane, phenyl-trichlorosilane, dimethylchlorosilane, diethyldichlorosilane, diphenyldichlorosilane, methylphenyldichlorosilane, or tri-methylchlorosilane.

16. The method of claim 1, wherein the aluminum compound comprises triethylaluminum, triisobutylaluminum, ethylaluminum dichloride, diethylaluminum chloride, ethylaluminum sesquichloride, or mixtures thereof.

* * * * *

UNITED STATES PATENT AND TRADEMARK OFFICE
CERTIFICATE OF CORRECTION

PATENT NO. : 6,762,145 B2
DATED : July 13, 2004
INVENTOR(S) : Yang et al.

It is certified that error appears in the above-identified patent and that said Letters Patent is hereby corrected as shown below:

Column 12,
Line 45, please delete "and is a" and substitute therefor -- and *a* is a --.

Column 13,
Line 9, please delete "integer of 1-14" and substitute therefor -- integer of 1-4 --.
Line 28, please delete "methyl-hydroxy" and substitute therefor -- methyl-4-hydroxy --.

Signed and Sealed this

Twenty-first Day of December, 2004

JON W. DUDAS
*Director of the United States Patent and Trademark Office*